United States Patent [19]

Zeren

[11] Patent Number: 5,273,561
[45] Date of Patent: Dec. 28, 1993

[54] CRITICALLY SAFE VOLUME VACUUM PICKUP FOR USE IN WET OR DRY CLEANUP OF RADIOACTIVE ENCLOSURES

[76] Inventor: Joseph D. Zeren, 390 Forest Ave., Boulder, Colo. 80304

[21] Appl. No.: 996,324

[22] Filed: Dec. 23, 1992

[51] Int. Cl.$^5$ .............................................. B01D 46/02
[52] U.S. Cl. ...................................... 55/216; 55/379; 55/380; 55/471; 55/487; 55/525; 55/DIG. 3; 55/DIG. 9
[58] Field of Search .................. 55/216, 320, 379, 386, 55/382, 471, 472, 486, 487, 525, DIG. 3, DIG. 9

[56] References Cited

U.S. PATENT DOCUMENTS

| | | |
|---|---|---|
| 2,703,152 | 3/1955 | Petersen .............................. 55/216 |
| 2,721,625 | 10/1955 | Lagerstrom . |
| 3,343,344 | 9/1967 | Fairaizl et al. . |
| 3,961,921 | 6/1976 | Heiman et al. . |
| 4,061,480 | 12/1977 | Frye et al. . |
| 4,894,881 | 1/1990 | Palmer et al. . |

Primary Examiner—Charles Hart
Attorney, Agent, or Firm—Francis A. Sirr; Earl C. Hancock

[57] ABSTRACT

A physical compact vacuum pickup device of critically safe volume and geometric shape is provided for use in radioactive enclosures, such as a small glove box, to facilitate manual cleanup of either wet or dry radioactive material. The device is constructed and arranged so as to remain safe when filled to capacity with plutonium-239 oxide. Two fine mesh filter bags are supported on the exterior of a rigid fine mesh stainless steel cup. This assembly is sealed within, and spaced from, the interior walls of a stainless steel canister. An air inlet communicates with the interior of the canister. A modified conventional vacuum head is physically connected to, and associated with, the interior of the mesh cup. The volume of the canister, as defined by the space between the mesh cup and the interior walls of the canister, forms a critically safe volume and geometric shape for dry radioactive particles that are gathered within the canister. A critically safe liquid volume is maintained by operation of a suction terminating float valve, and/or by operation of redundant vacuum check/liquid drain valves and placement of the air inlet.

12 Claims, 4 Drawing Sheets

CRITICALLY SAFE VOLUME VACUUM PICKUP FOR USE IN WET OR DRY CLEANUP OF RADIOACTIVE ENCLOSURES

This invention was made with Government support under United States Department of Energy contract DE-AC04-90DP62349. The United Sates Government has certain license rights in this invention.

BACKGROUND OF THE INVENTION

1. Field of the Invention

This invention relates to the field of vacuum cleaners, and more particularly, to vacuum cleaners of small physical size that are especially constructed and arranged for the cleanup of wet or dry radioactive materials within a small workspace enclosure, such as a glove box.

2. Description of Related Art

Cleanup of radioactive material is addressed in the art. For example, U.S. Pat. No. 4,061,480 provides a vacuum cleaner having a head section housing a motor and a fan. The head section sits on top of a filter unit comprising a filter cartridge, and a bag that comprises a primary filter for the cartridge. The filter unit is contained within a bladder that is impervious to air. Intake to the cleaner comprises an intake port connected to the area enclosed by the bladder. In this way, the material collected by the vacuum cleaner may be disposed of by unitary removing of the bladder and the filter unit.

The problem of hazardous material cleanup of wet or dry material has been addressed in the art. For example, U.S. Pat. No. 4,894,881 provides an open top base reservoir that contains a collection bag, the collection bag being used only for dry cleanup situations. An adapter unit sits on top of the base member. The upper portion of the adapter unit contains a vacuum motor that draws air from within the collection bag, first through a cloth filter bag, and then through a HEPA filter. A ball valve is positioned between the collection bag and the cloth filter bag to interrupt air flow when the base member is full of wet material.

Other patents of interest are U.S. Pat. No. 2,721,625 which describes a compact canister type vacuum cleaner having an upper shell that contains a motor and a fan. A lower shell contains an air inlet and a removable paper bag primary filter. Intake air first passes through the primary filter, then passes through a cloth bag secondary filter, and then passes through an air purifying germ trap comprising a fine mesh screen and fabric. Air then passes through the motor/fan to an exhaust outlet. U.S. Pat. No. 3,343,344 describes a canister-type vacuum cleaner having a lower pan-like container that includes an air inlet opening. A motor/fan unit projects downward into this container. A rigid conical support and its conical paper filter are located intermediate the motor/fan unit and the interior of the container. An air impervious polyethylene bag separates the conical filter from the interior of the container, so as to facilitate removal of the filter and its bag, along with accumulated dust, and the like. Means are provided to equalize the air pressure between the inside and the outside of the bag, so as to prevent collapse of the bag against the conical filter. U.S. Pat. No. 3,961,921 is generally similar in that it describes a shop-type vacuum cleaner having an open top air impermeable bag that is removable to facilitate unloading of the vacuum cleaner. A means is provided to prevent collapsing of the bag against a motor/fan assembly.

While these devices are generally suitable for their diverse intended purposes, the need remains in the art for a critically safe volume vacuum cleaner or pickup for use in the wet, or dry, cleanup of small radioactive workspace enclosures such as glove boxes. Particularly, the need remains for a vacuum pickup having utility in the pickup of plutonium 239 oxide, and which does not require the use of neutron absorption devices such as the well known boron Raschig rings.

SUMMARY OF THE INVENTION

It is known that for reasons of safety, containers holding radioactive materials must be made of a defined class of materials, such as stainless steel. The containers must also meet defined geometric and volumetric criteria. Stainless steel is used primarily to prevent corrosion and leakage. The use of rubbers and plastics that do not degrade in the presence of radiation is also preferred.

This invention provides a physically compact vacuum cleaner that is constructed and arranged to ensure that collected radioactive material is accumulated in a container having a critically safe volumetric capacity and geometric shape when the cleaner is in either a preferred vertical, or a tipped horizontal position.

In a preferred embodiment, the vacuum cleaner of this invention comprises a small (i.e., physically compact) position insensitive vacuum cleaner of a critically safe and limited capacity slightly less that four liters. A primary use for devices constructed and arranged in accordance with the invention is the manual cleanup of either wet or dry radioactive material in small radioactive material work spaces; for example, in well-known glove boxes. As will be appreciated by those skilled in the art, since the construction to be described does not include a HEPA filter, the device is intended for use only within an enclosure that has its own HEPA filter or an equivalent thereto.

In devices constructed in accordance with the invention, the collected radioactive material, such as plutonium 239 oxide, is maintained in a volume whose shape comprises a critically safe cylindrical configuration.

More specifically, two compliant filter bags are supported against the outside of a rigid cup-shaped steel mesh filter. The interior of the mesh cup communicates with a source of vacuum pressure in the form of a modified, but generally conventional, power head comprising an electrical motor and an air fan that is driven by the motor. The exterior of the mesh cup, and the two compliant cloth filters that are supported thereby, are concentrically sealed within a somewhat larger cup-shaped steel canister, to thus define a cylindrical collection area of critically safe volume (i.e., capacity and shape) for either liquids or dry particulate. The suction input of the vacuum cleaner communicates with the sealed interior of the canister. Thus, dry radioactive particles, or a sludge of radioactive particles when a wet area is vacuumed, are confined within the canister on the upstream air flow side of the two filters that are supported by the rigid mesh cup.

Due to the limited capacity of the canister, and due to safety features found the canister, the vacuum cleaner of the invention provides safe use without relying upon safety features, such as well known neutron absorbing boron Raschig rings that are generally used when working with very reactive materials such as plutonium-239.

The vacuum cleaner of the invention operates to maintain a critically safe volumetric configuration of the gathered radioactive particles, regardless of the vertical-to-horizontal position of the vacuum cleaner. For example, if the work station's sprinkler system is activated, the vacuum cleaner will maintain a critically safe liquid volume in any vertical-to-horizontal position of the vacuum cleaner. This is done by providing redundant automatic vacuum check/liquid drain valves about the circumference of the canister. These drain valves operate to release vacuumed liquid through the drains, under vacuum, if the pickup device is tipped over, or if the operator attempts to overfill the device by holding the pickup hose above the device. These drain valves also prevent overfilling of the pickup device when overhead fire sprinklers become active within the cell or glove box in which the device is being operated.

As a feature of the invention, a float-operated air valve is provided within the interior of the cup-shaped steel mesh filter at a location downstream of the filters. Should the amount of liquid within the canister accumulate to a given level, this float valve operates to block air flow into the vacuum head. Suction is thereby terminated. Thus, the liquid level within the canister is controlled by operation of the float valve. In the event that the vacuum cleaner tips, or in the event that the float valve fails to operate, the liquid level is controlled by operation of the automatic drain valves.

When the device of the invention is used to pick up wet material, the two filter bags are not generally used. In this case, a sludge buildup at the physical location of the float valve is prevented, or limited, by the use of the stainless steel mesh filter; i.e., a 100 mesh filter. In addition, when liquid is being picked up, liquid accumulation in the canister is limited to a maximum level by operation of the float valve and the vacuum check/liquid drain valves and the height location of the air inlet.

As a feature of the invention, the motor's cooling air intake and exhaust shields are designed to divert overhead spray that may exist in the area; such as, for example, from fire sprinkler heads.

Since the device of this invention is intended for use in radioactive work cells, such a glove boxes, a HEPA filter is not required. Very small particulate may penetrate the filter bags, as is true in any conventional vacuum cleaner. This condition is not, however, important because radioactive work areas, such as glove boxes, are equipped with their own highly efficient vent/filtering systems. The filter bags of the invention are installed and removed using the gloves that are a portion of the glove box. More specifically, the power head is removed, the bags and their top elastic bands are removed, and the debris in the bottom of the canister containing plutonium 239, is emptied into a special and well-known container.

These and other of objects and advantages of the invention will be apparent to those of skill in the art upon reference to the following detailed description, which description makes reference to the drawing.

DESCRIPTION OF THE PREFERRED EMBODIMENT

Figure 1:
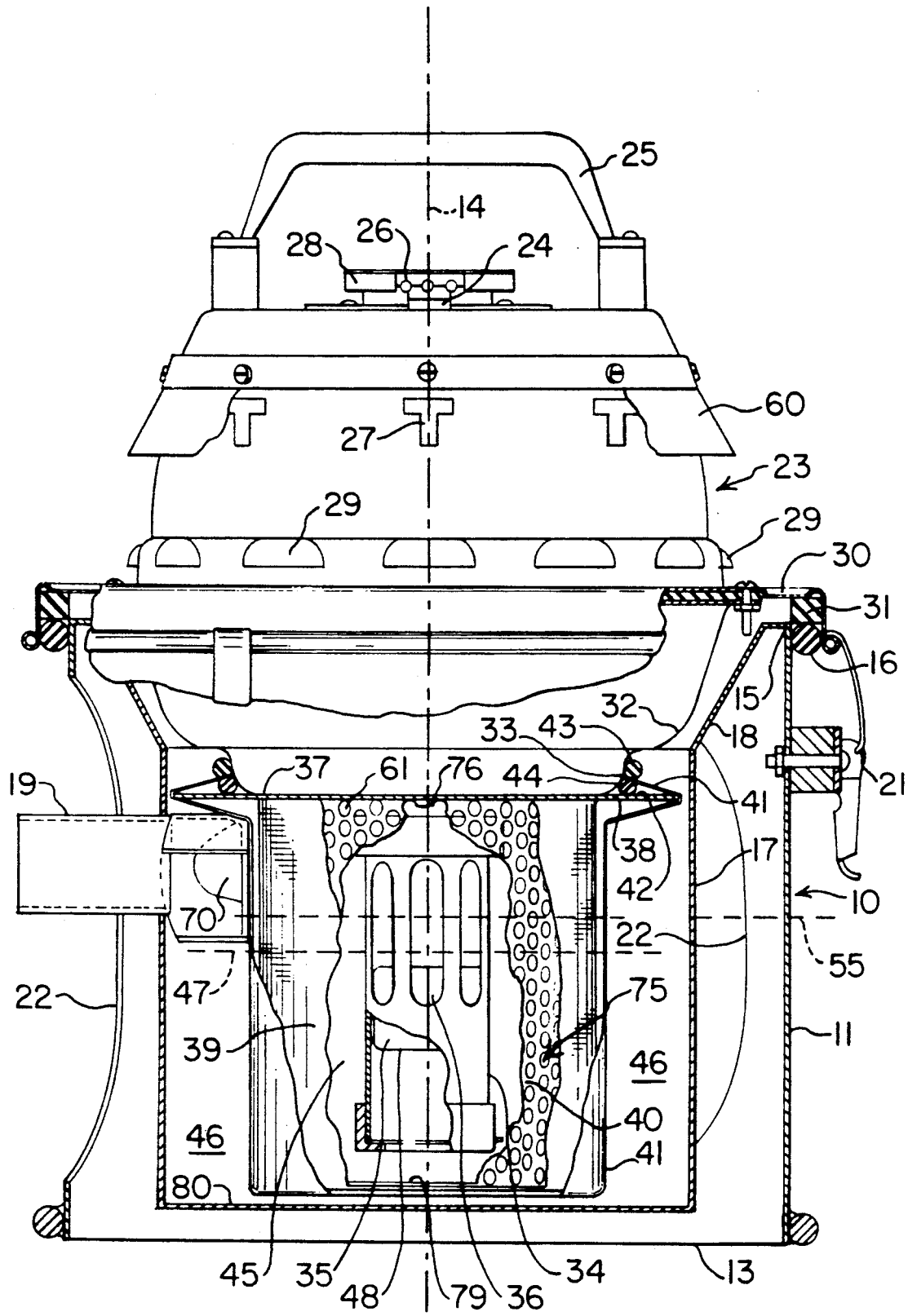
FIG. 1 is a side view of the invention wherein portions of the device are shown cutaway, and other portions of the device are shown in section.

FIG. 1 is a side view of a vacuum pickup, or vacuum cleaner device, in accordance with the invention, portions of the device being shown in cutaway, and other portions of the device being shown in section. As stated, the vacuum cleaner of this invention provides a physically compact device that is constructed and arranged to ensure that collected radioactive material, such as plutonium 239 oxide, is accumulated in a lower container 10 having a critically safe volumetric capacity and geometric shape.

While the intended use of the invention is not to be considered as a limitation thereon, the preferred embodiment of FIG. 1 is intended for use in the manual cleanup of either wet, or dry, radioactive material, such as plutonium oxide, that exists in small radioactive material work spaces, such as the well-known glove boxes. As will be apparent in accordance with the invention, collected radioactive material is collected in a cylindrical volume 46 whose shape and capacity are critically safe for the containment of highly radioactive material, such as plutonium 239 oxide. This geometric configuration 46 has a capacity of slightly less than about four liters.

Container 10 comprises a number of individual components that are assembled into a unitary device. More specifically, a tubular shaped outer stainless steel housing 11, which is open on both its upper and lower ends, provides an annular surface 13 that comprises the base of the vacuum cleaner. The cylindrical shape of housing 11 defines a central axis 14 that is intended to be oriented in a generally vertical direction during use of the vacuum cleaner. As will be apparent, horizontal surface 13 sits upon the floor of a radioactive workspace. While not critical to the invention, housing 11 operates to hold the bottom surface 79 of canister 17 off of the workspace floor to thus minimize the effect of neutron reflection.

The upper annular horizontal surface 15 of housing 11 is provided with an annular O-ring shaped stainless steel ring 16 that is welded to the outer surface of housing 11 for a clamping purpose to be described. As will be apparent upon reference to FIG. 2, housing 11 supports three manually operated mechanical clamps 21 of conventional construction. Clamps 21 are spaced at generally 120 degree intervals about the circumference of housing 11.

An open top, cup-shaped, stainless steel canister 17 is welded to the upper annular surface 15 of housing 11 by way of a short upper conical section 18. As will be apparent upon reference to FIG. 2, canister 17 supports tubular stainless steel suction air intake 19, and two gravity operated vacuum check/liquid drain valves 20, the three devices 19,20 being spaced at generally 120 degree intervals about the circumference of canister 17. A horizontal plane is defined by reference numeral 55. As will be apparent, the bottom surface of inlet 19 and the operative center of drain valves 20 lie in plane 55. More specifically, it is to be noted that the center of 5 solid stainless steel metal balls 51 (see FIG. 3) lie on horizontal plane 55, and the bottom surface of air intake 19 also lies on plane 55. When the device is used to pick up liquid, and should float 35 fail to terminate suction when the liquid level rises to plane 47, then later, when the liquid level rise still higher to plane 55, inlet 19 and valves 20 then operate to prevent a further buildup of liquid.

Valves 20 are defined as vacuum check/liquid drain valves in that they are constructed and arranged to prevent the escape of suction, or vacuum, from the interior volume 46 of canister 17, and yet when liquid rises in canister 17 to the level of valves 20 and plane 55, as for example, when the vacuum cleaner is tipped so that its axis 14 is no longer vertical, valves 20 and/or inlet 19 then operate to allow liquid to escape from the inner portion 46 of canister 17.

Housing 11 is provided with three 120-degree spaced cutouts 22 (see FIGS. 1 and 3) through which air intake 19 and valves 20 physically extend. Cutouts 22 not only reduce the weight of the vacuum cleaner, but they also operate to reduce neutron reflection by minimizing the cylindrical metal area of outer stainless steel shell or housing 11.

Reference numeral 23 generally identifies the devices upper power head. Power head 23 is shaped generally symmetrical about axis 14. Power head 23 is of somewhat modified but conventional construction and will not be described in detail. It suffices to say that power head 23 includes an electrical motor, an air fan that is driven by the motor, a motor on/off switch 24 and a handle 25. In accordance with a feature of the invention that modifies power head 23, both the motor's cooling air inlets 26 and outlets 27 are provided with shrouds 28,60, respectively (both of which are partially broken away in FIG. 1). In a like manner, the vacuum exhaust outlets are provided with shrouds 29. These various shrouds are modifications to a commercially-available power head, and are designed to divert any overhead spray that may exist in the area in which the device is used and stored. Power head 23 provides an exemplary air flow of about 95 cubic feet per minute.

Figure 5:
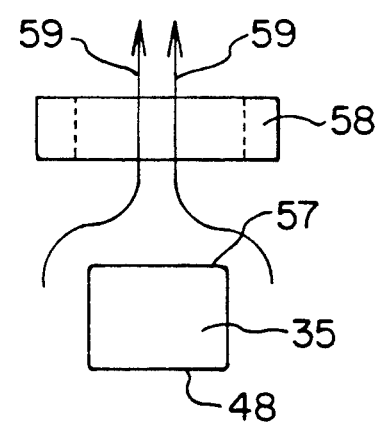
FIG. 5 is a view showing how the liquid responsive float of FIG. 1 operates to terminate suction when liquid rises to a given level.

Power head 23 includes an annular stainless steel washer-shaped ring 30 that carries an annular viton (flurocarbon) seal 31 by which operation of clamps 21 is effective to seal power head 23 to housing 10. The lower portion of power head 23 includes a larger diameter conical/spherical portion 32, a smaller diameter conical/spherical portion 33, and a hollow, protruding, tubular shaped plastic or stainless steel housing 34 that houses a generally vertically movable liquid responsive float 35. Housing 34 includes a plurality of windows, or openings, 36 by which air is allowed to flow to the interior of power head 23. FIG. 5 is a view showing how liquid responsive float 35 of FIG. 1 operates to terminate suction when liquid rises to the level of plane 47. More specifically, the top surface 57 of float 35 rises to seal against valve seat 58, thus termination suction air flow as represented by arrows 59.

FIG. 1 provides a horizontal reference plane 47 to identify the general position of the bottom surface 48 of float 35, whereat float 48 operates to terminate air flow to the fan within power head 23, thus causing suction to the internal portion of canister 17 to be terminated. Note that in FIG. 1, and only for purposes of drawing clarity, float 35 is shown in a mid-vertical position where its bottom surface 48 is spaced from the bottom of cage 34.

As a safely feature of the invention, should the vacuuming of wet material fill canister 17 with liquid continue until the top surface of the liquid reaches plane 47, then the suction at inlet 19 is automatically terminated as the top surface of float 35 operates, as shown in FIG. 5, to prevent the flow of air 59 to power head 23. It is to be noted that float 35 not only operates to terminate suction when liquid rises to level 47 within canister 17, but float 35 also operates to prevent liquid from entering the fan portion of power head 23.

The lower, generally horizontal surface 37 of the power heads smaller conical/spherical portion 33 has a stainless steel washer-shaped disk 38 attached thereto. A rigid, cup-shaped stainless steel cup 40, having a plurality of relatively large openings 61 covering the entire cup-shaped surface thereof (for example, openings 61 about ¼-inch in diameter), is welded, or soldered, to the under side of disk 38. A fine, stainless steel, cup-shaped, filter element 39 (for example, of about 100 mesh size) covers cup 40, and its relatively large holes 61. Filter element 39 is mounted on cup 40 as by soldering. Filter element 39 preferably comprises the brand Cambridge market grade wire cloth, T-316 stainless steel, 100 mesh, with 0.0045-inch diameter wire.

Outer and inner filter bags 41,42 are supported against the outside of the rigid cup-shaped structure comprising steel cup 40 and steel mesh filter 39. Bags 41,42 may be standard commercially-available cloth or paper filter bags. The filtration particle size of bags 41,42 is not critical, since the device of the invention is intended for use inside of radioactive work areas, or enclosures that have there own filtration systems. The upper annular portions of filter bags 41,42 are provided with elastic bands or O-rings 43,44 that are stressed so as to generally form a seal to the outside surface of conical/spherical portion 33.

Figure 3:
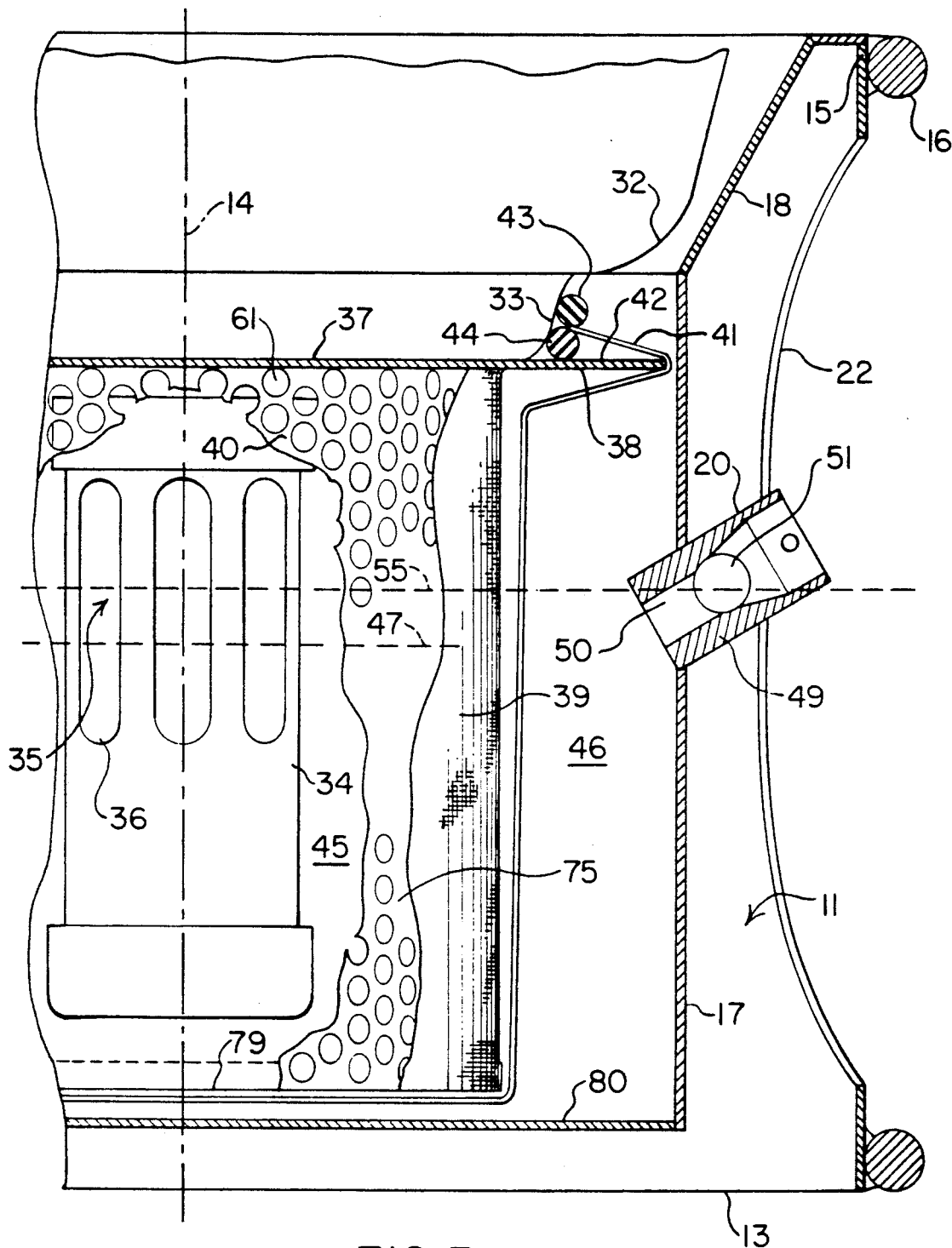
FIG. 3 is a side view of a portion of the invention, showing details of construction of one of the two gravity operated vacuum check/liquid drain valves of FIG. 2, the other valve being of identical construction.
Figure 4:
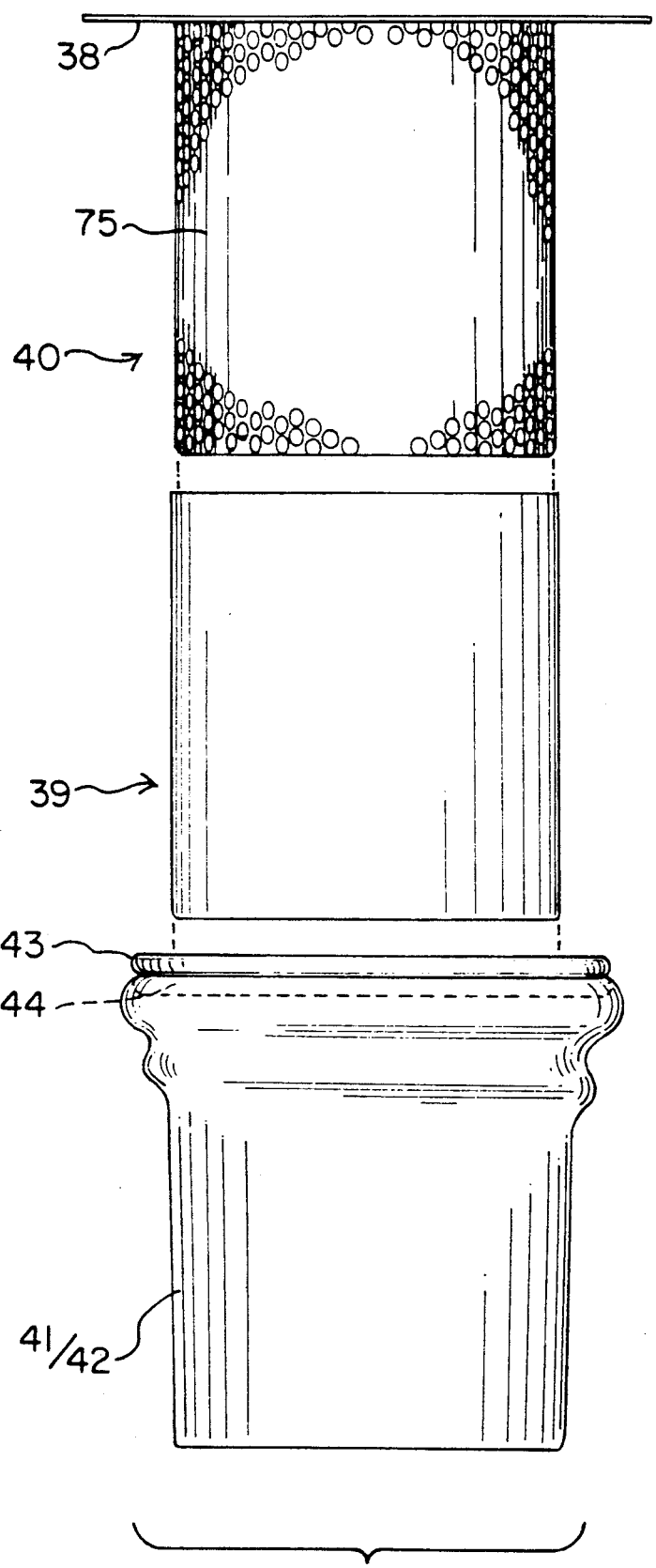
FIG. 4 is an exploded view showing the nesting arrangement of the metal cup, steel mesh filter and filter bags of FIGS. 1 and 3.

FIG. 4 is an exploded view showing the nesting arrangement of metal cup 40, steel mesh filter 39 and filter bags 41/42. When switch 24 (see FIG. 1) is actuated to its on position, the interior volume 45 (see FIGS. 1 and 3) of cup 40 receives vacuum or suction pressure. The exterior surface of rigid cup 40 physically supports screen mesh filter 39, and the two bag filters 41,42. Cup 40, and to some extent filter 39, thus prevent filters 41,42 from collapsing due to this internal suction force.

Operation of O-rings 43,44 causes filters 41,42 to be sealed within the somewhat larger cup-shaped steel canister 17, thus defining a generally cylindrically shaped dry material collection area 46 of critically safe volume (i.e., critically safe capacity and shape).

In order to define the compact nature of the invention, the various dimensions of the device will now be described Cylindrical housing 11 is about 9.68 inches high, and about 11.75 inches in diameter. When circular-shaped power head 23 is coupled, or clamped, to housing 11, the overall height of the vacuum cleaner is about 17 inches.

Cylindrical canister 17 sits concentrically within housing 11. Canister 17 is about 8.5-inches in diameter. The vertical height of canister 17, as measured from its bottom surface 80 to the lower edge of its conical section 18, is about 7.25 inches. The height of conical section 18 is about 1.94 inches. The diameter of the upper edge of conical section 18 is about 10.86 inches.

Cylindrical cup 40 sits concentrically within canister 17. Cup 40 is about 5.5 inches in diameter. The vertical height of cup 40 is about 6.12 inches. The bottom surface 79 of cup 40 extends parallel to bottom surface 80 of canister 17 and is spaced about ¼ inch above canister surface 80.

Plane 55 that is occupied by the center of balls 51 and the bottom of inlet tube 19 is about 4.625 inches above the bottom surface 80 of canister 17. Plane 47, at which liquid level responsive float 35 operates to terminate suction, is about 4.25 inches above the bottom surface 80 of canister 17.

As a result of the above-defined construction and arrangement, the dry collection volume 46 in which plutonium debris is collected comprises a vertically extending cylindrical volume whose outer diameter is about 8.5 inches, whose inner diameter is about 5.5 inches, and whose height extends from the bottom of canister 17 to about the level of horizontal surface 38. Collection volume 46 also includes a thin, horizontal, flat disk shaped volume that is located in the space between the bottom 79 of cup 40 and the bottom 80 of canister 17. This dry material collection volume 46 is about 242.68 cubic inches. The devices wet collection volume extends only to the height of plane 55, and comprises a volume of about 241.66 cubic inches.

Suction input 19 of the vacuum cleaner communicates with the sealed interior volume 46 of canister 17. Thus, dry radioactive particles, or a sludge or liquid having radioactive particles therein when a wet area is vacuumed, are confined within canister 17. Dry material is contained on the downstream air flow side of the three filters members 39,41,42 that are supported by the rigid cup 40.

When liquid is being picked up by operation of the device, filters 41,42 are not used and liquid penetrates mesh filter 39 and seeks a level within the entire volume of canister 17. Liquid responsive air flow valve 35 operates to terminate suction and liquid pickup when the level of the liquid reaches horizontal plane 47. Should operation of air flow valve 35 fail to stop the filling of canister 17 with liquid when the level of the liquid later rises to the slightly higher level of plane 55, the two vacuum check/liquid drain valves 20 and inlet 19 operate to release liquid.

As a feature of the invention, the operation of fine mesh screen 39 prevents a sludge buildup at the physical location of float 35 when liquid is being picked up.

Air flow inlet 19 includes an air diverter surface 70 that operates to divert radioactive debris counter clockwise (as viewed from above), and downward at an angle of about 30— degrees to a horizontal plane, such as plane 55. This creates a vortex within the internal area 46 of canister 17. This vortex air flow operates to impel the heavier radioactive particles to the bottom surface 80 of canister 17.

Due to the limited capacity of canister volume 46, the vacuum cleaner of the invention provides safe use without relying upon safety features such as well known boron Raschig rings to provided neutron absorption.

As stated above, and as a further safety feature of the invention, a means 19,20 is provided to automatically drain volume, or cavity, 46 of any unsafe portion of its liquid content, should any attempt be made to overfill the vacuum cleaner above level 55, or should any condition exist that results in overfilling the vacuum cleaner.

For example, if a work station (such as a glove box) experiences an accident that activates the glove box sprinkler system, not only will the vacuum cleaner of the invention maintain a safe liquid volume within cavity 46 by way of float 35 operating to terminate the power head's suction force when liquid reaches level 47, but also canister 17 is provided with a plurality of redundant liquid drain means 19,20 whereby liquid may leak out of cavity 46 if the device tips or if float 35 fails to operate as intended.

FIG. 3 is a side view of a portion of the invention, showing the details of construction of one of the two gravity operated vacuum check/liquid drain valves 20, the other valve 20 being of identical construction. Each such valve comprises a stainless steel tubular member 49 having a generally cylindrical channel 50 that is normally sealed by operation of a solid stainless steel ball 51. When the vacuum cleaners axis 14 is oriented generally vertically, as it is in FIG. 3, ball 51 is held in its sealing position by both the force of gravity and the vacuum force within cavity 46. However, when axis 14 tips to a near-horizontal position, as when the vacuum cleaner is tipped to one side of its base 13, then the force of gravity and/or the weight of liquid within canister 17 operate to move one, or both, of the balls 51 to positions where channels 50 are no longer sealed. In addition, and depending upon the angle of tilt of axis 14, inlet 19 may operate to drain liquid from cavity 46. By providing redundant liquid drains 19,20 about the circumference of canister 17, the drains operate to release vacuumed liquid from cavity 46, even though cavity 46 is under vacuum. Should the device be tipped when no liquid is present in cavity 46, then the force of vacuum will generally maintain channels 50 closed, or in the alternative, only a minimal amount of suction air flow is diverted to flow into cavity 46 through channels 50.

It is to be noted that the construction and arrangement of float 35 and valves 20 is fail-safe in that should float 35 fail to terminate suction when liquid reaches level 47, only a short time later the liquid will rise to level 55 and the higher level of valves 20 and inlet 19. At this time, liquid will start to drain out of canister 17 through valves 20 and inlet 19 since the affect of the liquid pressure at valves 20 and inlet 19 is greater than the vacuum pressure above this higher liquid level.

After use, the vacuumed contents of the vacuum cleaner are removed by working through the glove ports of the work area. More specifically, power head 23, its metal cup 40, its fine mesh screen 39 and its bag filters 41,42 are removed from canister 17. Filter bags 41,42 may be removed and reloaded with clean filter bags if desired. The radioactive debris resting on the bottom of canister 17, and perhaps the used filter bags 41,42, are then placed in special critically engineered containers for disposal.

From the above detailed description, it can be seen that a vacuum pickup is provided for use in the cleanup of radioactive debris that may reside within a radioactive enclosure having a generally horizontal floor. The vacuum pickup of the invention is constructed and arranged to rest on the floor of the enclosure both when in use and when awaiting use. The vacuum pickup comprises a cylindrical metal housing 11 having an open, and generally circular bottom horizontal surface 13, that is adapted to sit on the floor of the enclosure. Housing 11 also has an open, and generally circular top surface 15, that is spaced directly above and generally parallel to its bottom surface 13.

Figure 2:
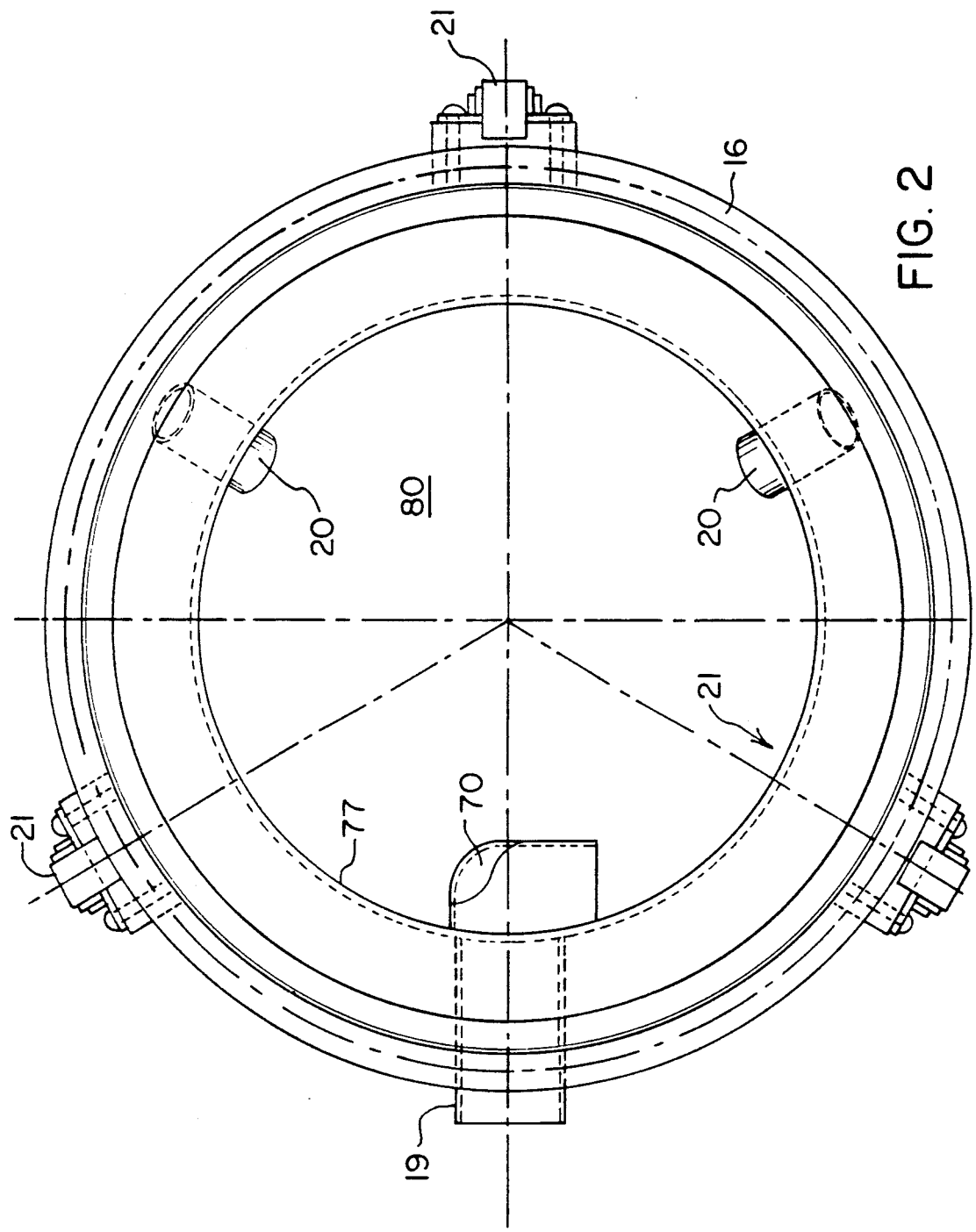
FIG. 2 is a top section view of the device of FIG. 1 showing the location of the device's air intake, the location of three mechanical clamps that clamp the upper power head to the lower canister, and the location of two vacuum check/liquid drain valves.

A cup-shaped metal canister 17 has a continuous (i.e., not perforated) vertical cylindrical wall 77, of lesser diameter than the diameter of housing 11, and a continuous horizontally extending bottom surface 80 (see FIG. 2). Canister wall 77 and bottom surface 80 establish a cup-shaped interior surface that defines the outer surface of debris collection volume 46.

An open and generally circular top surface 18 of canister 17 is secured to the top surface 15 of housing 11 so as to mount canister 17 generally concentrically within housing 11 with canister wall 77 spaced from housing 11, and with the canister's bottom surface 80 spaced above the bottom surface 13 of housing 11, and thus above the floor of the enclosure.

A suction power head 23 provides a generally circular bottom portion 32,33 that is removably clamped to the top surface 15 of housing 11 so as to seal power head 23 relative to the interior surface 77,80 of canister 17 and collection volume 46.

A perforated metal cup 40 has a generally circular open top 76 secured to the bottom portion of power head 23. Cup 40 is made up of a perforated vertically extending cylindrical wall 75 of lesser diameter than the diameter of canister 17, and a perforated horizontally extending bottom surface 79. Cup wall 75 and bottom surface 79 establish a cup-shaped exterior surface that defines the inner surface of debris collection volume 46. A flexible fine mesh metal filter 39 covers the cup-shaped exterior surface of metal cup 40, and two flexible bag filters 41,42 cover the exterior surface of metal filter 39.

An air inlet 19 is located generally intermediate the top 76 and the bottom 79 of canister 17 so as to allow debris containing air to flow from inlet 19 into collection volume 46. The debris is removed from the air as the air then moves through bag filters 41,42, thru metal filter 39, and through perforated cup 40 to power head 23.

Features of the invention include, neutron reflection from housing 11 is minimized by providing perforations 22 in the housing wall intermediate the top and bottom surfaces 15,13 thereof, the various parts of the vacuum pickup are formed of stainless steel, a plurality of spaced vacuum check/liquid drain valves 20 are located in cylindrical canister wall 77 at a given horizontal distance above canister bottom surface 79, air inlet 19 is also located in canister wall 77 at this same horizontal position above canister bottom surface 79, and a liquid responsive float valve 35 is provided within cup 40 so as to terminate suction force by power head 23 in the event that a given amount of liquid should accumulate in canister 17.

While the invention has been described with reference to preferred embodiments thereof, it is apparent that those skilled in the art will readily visualize yet other embodiments that are within the spirit and scope of the invention. Thus, it is intended that the invention be limited only by the content of the following claims.

What is claimed is:

1. A vacuum pickup for use in debris cleanup within a radioactive enclosure having a generally horizontal floor, said pickup being constructed and arranged to rest on the floor of said enclosure, said pickup comprising;

a cylindrical metal housing having an open and generally circular bottom horizontal surface adapted to sit on the floor of the enclosure, and having an open and generally circular top surface spaced directly above and generally parallel to said bottom surface, a cup-shaped metal canister having a continuous vertical cylindrical wall of lesser diameter than said housing, and having a continuous horizontally extending bottom surface, said canister wall and bottom surface establishing a cup-shaped interior surface that defines an outer surface of a debris collection volume, said canister having an open and generally circular top surface secured to the top surface of said housing so as to mount said canister generally concentrically within said housing with said canister wall spaced from said housing, a suction power head having a generally circular bottom portion removable clamped to the top surface of said housing so as to seal the bottom portion of said power head relative to the interior surface of said canister and said collection volume, a perforated metal cup having a generally circular open top secured to the bottom portion of said power head, said metal cup having a perforated vertical cylindrical wall of lesser diameter than said canister, and having a perforated horizontally extending bottom surface, said cup wall and bottom surface establishing a cup-shaped exterior surface that defines the inner surface of said debris collection volume, a flexible fine mesh metal filter covering the exterior surface of said perforated metal cup, said metal filter having and external surface, at least one flexible bag filter covering the external surface of said metal filter, and air inlet means located generally intermediate the top and bottom surface of said canister so as to allow debris containing air to flow from said inlet into said collection volume, the debris being removed from the air as the air moves thought said bag filter, thru said metal filter, and through said perforated cup to said power head.

2. The vacuum pickup of claim 1 wherein said air inlet means includes air divertor means operable to induce vortex air flow in said collection volume.

3. The vacuum pickup of claim 1 including a liquid responsive float valve mounted on said bottom portion of said power head so as to be positioned within said perforated metal cup, said float valve operating to terminate suction by said power head in the event that liquid accumulates within said canister.

4. The vacuum pickup of claim 3 wherein said air inlet means includes air divertor means operable to induce vortex air flow in said collection volume.

5. The vacuum pickup of claim 4 wherein neutron reflection from said housing is minimized by providing perforations in said housing intermediate the top and bottom surfaces thereof.

6. The vacuum pickup of claim 5 wherein neutron reflection from the floor of said enclosure is minimized by spacing said canister bottom surface above the bottom surface of said housing and above the floor of the enclosure.

7. The vacuum pickup of claim 6 wherein said metal housing, metal canister, circular bottom portion of said power head, metal cup, metal filter, and air inlet means are formed of stainless steel.

8. The vacuum pickup of claim 1 including a plurality of spaced vacuum check/ liquid drain valves located in said cylindrical canister wall at a given horizontal distance above said canister bottom surface, and wherein said air inlet means is also located in said cylindrical canister wall at said given distance above said canister bottom surface.

9. The vacuum pickup of claim 8 including a liquid responsive float valve mounted on said circular bottom portion of said power head so as to be positioned within said perforated metal cup, said float valve operating to terminate suction by said power head in the event that liquid accumulates within said canister to a level that is below said given distance above said canister bottom surface.

10. The vacuum cleaner of claim 9 wherein said air inlet means includes air divertor means operable to induce vortex air flow in said collection volume.

11. The vacuum pickup of claim 10 wherein said metal housing, metal canister, circular bottom portion of said power head, metal cup, metal filter, and air inlet means are formed of stainless steel.

12. The vacuum pickup of claim 11 wherein neutron reflection from said housing is minimized by providing perforations in said housing intermediate the top and bottom surfaces thereof.

* * * * *